April 26, 1960   R. H. BISBING ET AL   2,934,234
RIVET EXPANDER TOOL
Filed June 6, 1958
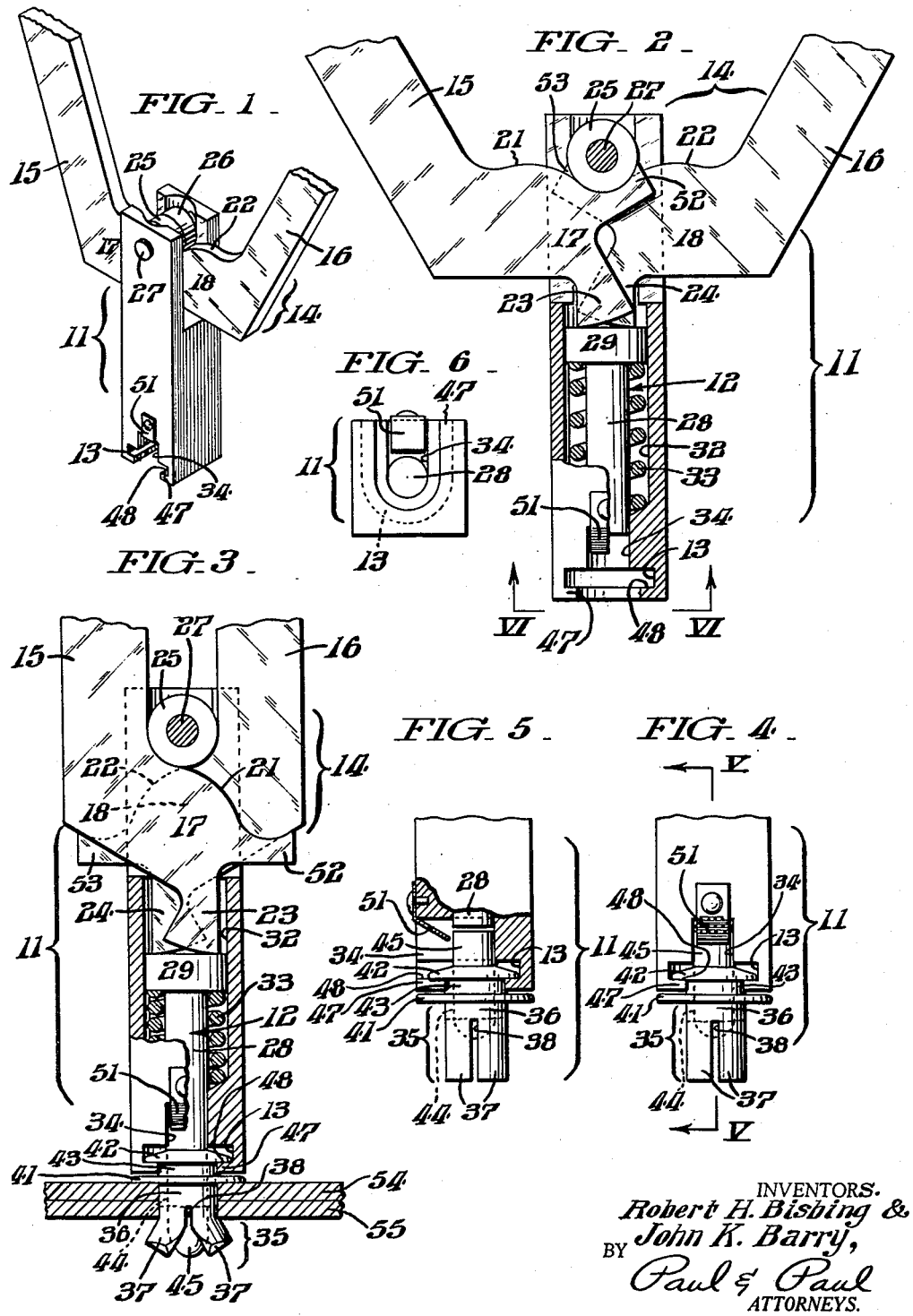
INVENTORS.
Robert H. Bisbing &
BY John K. Barry,
Paul & Paul
ATTORNEYS.

United States Patent Office 2,934,234
Patented Apr. 26, 1960

2,934,234

RIVET EXPANDER TOOL

Robert H. Bisbing, Upper Darby, and John K. Barry, Springfield, Pa., assignors to South Chester Corporation, Chester, Pa., a corporation of Delaware Application June 6, 1958, Serial No. 740,285

5 Claims. (Cl. 218—30)

This invention relates to tools used in riveting, and more particularly concerns improvements in a rivet expander tool for use with an expansion rivet, and with a plunger actuating mechanism used in the rivet expander tool.

It is an object of this invention to provide a rivet expander tool which has a great mechanical advantage whereby the tool is operated and the rivet expanded with minimum exertion on the part of the tool operator.

It is another object of this invention to provide a rivet expander tool which is of simple construction, and which has few moving parts. It is another object to provide such a tool which is ruggedly constructed, and is easily maintained.

It is another object of this invention to provide a rivet expander tool which utilizes roller contact in its operation.

Other objects and advantages of this invention will further become apparent hereinafter and in the drawings, in which:

Fig. 1 is a view in perspective of a rivet expander tool constructed in accordance with this invention;

Fig. 2 is a view in elevation and partly in section of the rivet expander tool shown in Fig. 1, and with the plunger forming an element of the invention shown in its retracted position;

Fig. 3 is a view similar to Fig. 2, but with the plunger forming an element of the invention shown in its forward position;

Fig. 4 is a view in front elevation of the tool head which forms an element of the invention and shows an expansion rivet positioned in the tool head;

Fig. 5 is a view in section taken as indicated by the lines and arrows V—V which appear in Fig. 4; and Fig. 6 is a view in bottom plan taken as indicated by the lines and arrows VI—VI which appear in Fig. 2.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, there is shown a rivet expander tool which includes a tool head 11 which houses a plunger 12 and which has formed therein a U-shaped transverse recess 13, and a plunger actuating mechanism 14 which includes handles 15, 16, cams 17, 18, having cam surfaces 21, 22, and push fingers 23, 24, and rollers 25, 26 which are rotatably mounted on pin 27 which is supported in tool head 11.

Plunger 12 has a plunger shaft 28 and a plunger head 29 and is adapted to be moved longitudinally within a plunger chamber 32 against the action of spring 33. This longitudinal movement is accomplished through the action of pusher fingers 23, 24 moving forwardly against the plunger head 29. Plunger shaft 28 is adapted to move in longitudinal recess 34 during the operation of expanding an expansion rivet 35.

Expansion rivet 35 comprises a tubular shank 36 having a head end and a prong end, prongs 37 formed by slots 38 located in the prong end of shank 36, a main head 41 formed at the head end of shank 36 and having a greater diameter than the shank, an auxiliary head 42 also formed at the head end of shank 36 with a groove 43 located between heads 41 and 42, and with a chamber 44 formed in the head end of shank 36 with a spreader pin 45 normally positioned in chamber 44 with the top end of spreader pin 45 extending outwardly from chamber 44 when the expansion rivet 35 is in its unexpanded condition.

U-shaped transverse recess 13 is provided with a side opening through which auxiliary head 42 of rivet 35 is passed for the rivet expanding operation. Transverse recess 13 is also provided with an overhanging portion which forms a lip 47 having a holding surface 48 which bears against the underside of rivet auxiliary head 42 during the expanding operation.

Longitudinal recess 34 receives, guides, and positions rivet spreader pin 45, and leaf spring 51 admits rivet spreader pin 45 to tool head 11, but prevents it from falling out.

Cams 17 and 18 are provided with stops 52, 53 which limit the movement of pusher fingers 23, 24 in the direction away from plunger 12.

The rivet expander tool is operated very simply. Normally the elements of the tool are positioned as shown in Figs. 1 and 2 with plunger 12 in its retracted position. When it is desired to rivet two sheets such as 54, 55 together, the auxiliary head 42 of expansion rivet 35 is passed through the side opening of U-shaped transverse recess 13 and is seated therein. Then shank 36 is placed within aligned openings in sheets 54 and 55. It is to be realized of course that this procedure may be reversed, with shank 36 being first placed within the aligned openings in sheets 54, 55, and then auxiliary head 42 being positioned within transverse recess 13.

The rivet expander tool is now ready for the rivet expanding operation. To expand rivet 35, the operator squeezes together the handles 15, 16 which moves cam surfaces 21, 22 along rollers 25, 26 and forces push fingers 23, 24 forwardly against plunger head 29 to move plunger shaft 28 against the top of rivet spreader pin 45. This drives rivet spreader pin 45 home so that its top is flush with the top of auxiliary head 42, and expands prongs 37 to securely rivet sheets 54 and 55 together.

It is to be noted that during this rivet expanding operation, there is no force applied to sheets 54 and 55. Accordingly sheets 54 and 55 are not subjected to stress or strain during the rivet expanding operation. The force during the rivet expanding operation is exerted on auxiliary head 42 and rivet spreader pin 45.

The construction of the rivet expander tool is such that great force is exerted on plunger 13 with a minimum exertion on the part of the operator in squeezing together handles 15 and 16.

After rivet 35 has been expanded, tool head 11 is withdrawn from rivet auxiliary head 42 and the handles 15 and 16 are released so that the elements of the rivet expander tool again resume the position shown in Fig. 2 with handles 15 and 16 being prevented from further expanding apart by stops 52 and 53, with push fingers 23 and 24 in their upper position, and with plunger 13 being held in its retracted position through the action of spring 33.

It is to be understood that the form of the invention herein shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described our invention, we claim:

1. A rivet expander tool for use with a drive type expansion rivet having an auxiliary head and a spreader pin positioned within a chamber within the rivet and extending outwardly from the rivet head when the rivet is unexpanded, said tool comprising, a tool head, a plunger positioned within a chamber in the tool head and adapted to contact and drive said spreader pin, spring means normally holding said plunger in retracted position, said head having a transverse recess formed therein positioned outwardly of said plunger and adapted to receive the auxiliary head of said rivet, a lip formed by the overhang portion of said transverse recess adapted to contact the undersurface of said auxiliary head during the rivet expanding operation for holding said auxiliary head against longitudinal movement during the rivet expanding operation, a pair of cam means each having a push finger in contact with said plunger for moving said plunger forwardly to drive said spreader pin, roller means rotatably and fixedly and transversely connected to said tool head centrally thereof and rearwardly spaced from the rear end of said plunger and in contact with the cam surface of said cam means, said cam means being positioned between said roller means and said plunger, and partly within and surrounded by the walls of said tool head chamber so that it is secured in position and constrained only by said roller means, plunger, spring and tool head chamber walls, and handle means connected to said cam means for moving said cam surface along the roller means for moving said push finger forwardly.

2. The rivet expander tool defined in claim 1, wherein the actuating surface of said push finger is a cam.

3. A rivet expander tool for use with a drive type expansion rivet having an auxiliary head and a spreader pin positioned within a chamber within the rivet and extending outwardly from the rivet head when the rivet is unexpanded, said tool comprising a tool head, means on the tool head adapted to fixedly relate the auxiliary head of the rivet to the tool head with the longitudinal axes of the tool head and rivet coincident, a plunger positioned within a chamber in the tool head and adapted to contact and drive said spreader pin into said rivet flush with the top of the auxiliary head, spring means normally holding the plunger in retracted position, reaction means fixedly and transversely connected to said head centrally thereof and rearwardly spaced from the rear end of said plunger, cam means for moving said plunger forwardly, said cam means positioned between and in contact with said reaction means and said plunger, and partly within and surrounded by the walls of said tool head chamber so that it is secured in position and constrained within said chamber only by said reaction means, plunger, spring, and tool head chamber walls, and handle means connected to said cam means for moving said cam means against said fixed reaction means whereby said plunger is moved forwardly.

4. A rivet expander tool for use with a drive type expansion rivet having an auxiliary head and a spreader pin positioned within a chamber within the rivet and extending outwardly from the rivet head when the rivet is unexpanded, said tool comprising a tool head, a plunger positioned within a chamber in the tool head and adapted to contact and drive said spreader pin, spring means normally holding said plunger in retracted position, said head having a transverse recess formed therein positioned outwardly of said plunger and adapted to receive the auxiliary head of said rivet, a lip formed by the overhang portion of said transverse recess adapted to contact the undersurface of said auxiliary head during the rivet expanding operation for holding said auxiliary head against longitudinal movement during said rivet expanding operation, cams means having a push finger in contact with said plunger for moving said plunger forwardly to drive said spreader pin, pin means fixedly and transversely connected to said tool head centrally thereof and rearwardly spaced from the rear end of said plunger and in contact with the cam surface of said cam means, and handle means constituting a planar extension of the cam body extending in the general direction of the longitudinal axis of the tool head connected to said cam to move said cam surface along said transverse pin means to move said push finger forwardly, said cam means being positioned between and in contact with said pin means and said plunger, and partly within and surrounded by the walls of said tool head chamber so that it is secured in position and constrained only by said pin means, plunger spring, and tool head chamber walls.

5. A rivet expander tool according to claim 4, wherein the transverse recess is closed at its terminal end radially opposite its entrance end, and further including a spring finger within said transverse recess for retaining the rivet in the tool head, said finger extending radially inwardly of the recess from the open end of the recess.

References Cited in the file of this patent

UNITED STATES PATENTS

| | | |
|---|---|---|
| 983,610 | Dooley | Feb. 7, 1911 |
| 1,037,680 | Spitzenberg | Sept. 3, 1912 |
| 1,425,542 | Raymond et al. | Aug. 15, 1922 |
| 1,966,883 | Clement | July 17, 1934 |
| 2,310,008 | Wolff | Feb. 2, 1943 |
| 2,326,855 | Hathorn | Aug. 17, 1943 |
| 2,389,479 | Austin | Nov. 20, 1945 |
| 2,428,458 | Hollworth | Oct. 7, 1947 |
| 2,443,193 | Necker | June 15, 1948 |
| 2,548,697 | Belpedio et al. | Apr. 10, 1951 |
| 2,559,845 | Blum | July 10, 1951 |
| 2,767,401 | Haberstump | Oct. 23, 1956 |